Dec. 29, 1970     G. E. SMEDBERG     3,551,231
PROCESS FOR PREPARING A TUFTED CARPET USING A HOT
MELT BACKSIZING COMPOSITION
Filed May 1, 1968
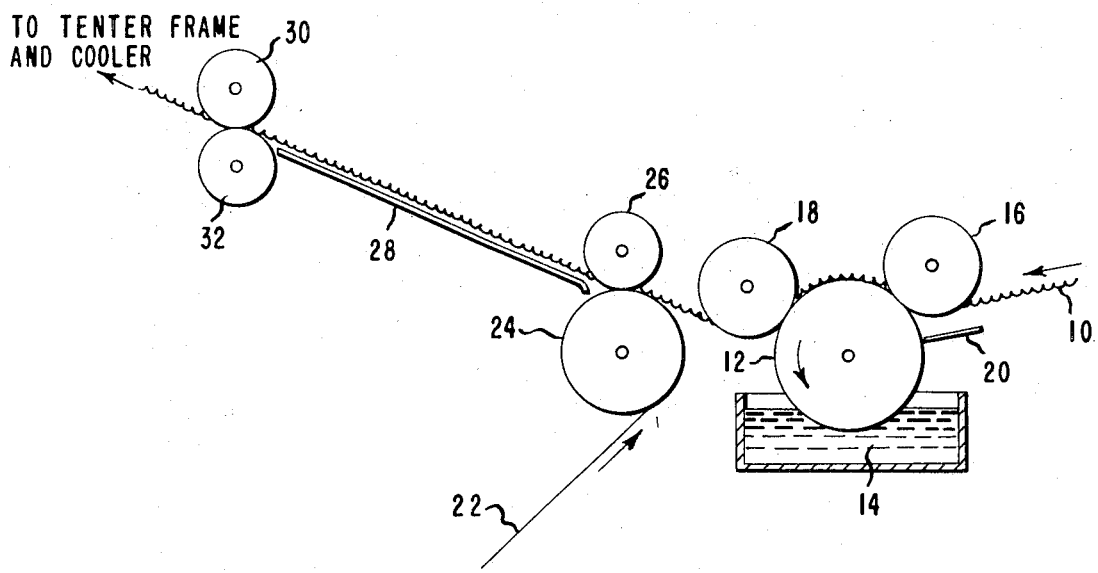
INVENTOR
GEORGE E. SMEDBERG
BY
ATTORNEY

United States Patent Office 3,551,231
Patented Dec. 29, 1970

3,551,231
PROCESS FOR PREPARING A TUFTED CARPET USING A HOT MELT BACKSIZING COMPOSITION
George E. Smedberg, Wilmington, Del., assignor to E. I. du Pont de Nemours and Company, Wilmington, Del., a corporation of Delaware
Filed May 1, 1968, Ser. No. 725,595
Int. Cl. D05c 15/00
U.S. Cl. 156—72                 8 Claims

ABSTRACT OF THE DISCLOSURE

An improved process for preparing a tufted carpet using a hot metal adhesive backsizing composition is described. The process involves applying a specified pressure (attained by specifically set hold-down rolls) on a tufted structure while it is in contact with an applicator roll bearing a hot melt adhesive and, substantially immediately thereafter, laminating to the structure a secondary scrim. Subsequently, the laminated structure is support until the adhesive has cooled to below its hot tack temperature.

BACKGROUND OF THE INVENTION

For many years the production of backsized tufted carpet has been accomplished by an aqueous latex method. This method initially involves preparing a tufted structure by stitching a primary backing material with yarn in such a manner as to form on the top surface of the material a pile composed of numerous closely spaced erect loops of yarn. Thereafter the bottom surface is coated with a latex containing a polymer binder such as a styrene-butadiene copolymer and a secondary backing material applied to the initial structure. The structure is then passed through an oven to dry the latex. By such a process, the carpet fibers are bonded to the primary scrim and the secondary backing is bonded to the carpet. While such a process for preparing carpets has been satisfactory from the standpoint of performance, the necessity of a drying step is a severe disadvantage from a cost standpoint and limits production speed.

Recently, however, there has been developed a new approach to the preparation of tufted carpets. It has been found that carpet can be prepared with a hot melt backsizing composition instead of an aqueous latex composition. By the use of a hot melt, the necessity of drying the composition after application is obviated and, further, when a secondary backing material is desired, it can be applied directly after the hot melt application with no necessity for a drying step. While such a hot melt method is quite appealing from the standpoint of cost, some difficulties have been encountered in preparing completely satisfactory carpet.

The hot melt method is generally accomplished by passing the bottom surface of the tufted structure over an applicator roll positioned in a reservoir containing the backsizing composition in a molten state. A doctor blade is ordinarily employed to control the amount of adhesive which is transferred from the application roll to the bottom surface of the structure. After application of the backsize to the bottom surface, and prior to cooling, a secondary backing material is brought into contact with the bottom surface, and the resulting structure is then passed through nip rolls and cooled. While this type of process is considerably simpler than the latex process, the preparation of carpets of non-uniform quality has, at times, been encountered. Thus, carpets could not, with reproducible consistency, be prepared with high scrim bonds (force required to remove the secondary backing from the finished carpet), high tuft pull strength (force required to pull one of the tufts out of the carpet), and high fuzz resistance (an indication of the individual carpet yarns to fuzz and form pills). In essence, heretofore there has been no process for preparing tufted carpets with hot melt adhesives which can, with a high degree of predictability, yield extraordinarily good carpet irrespective of the type of filament yarn used, the temperature of application of the hot melt, the density of tufting, the height of the pile, etc.

SUMMARY OF THE INVENTION

However, it has now been discovered that by carefully controlling several variables in the preparation of backsized carpet using a hot melt, extraordinarily good carpet can be consistently prepared. According to the present invention there are provided in the process of preparing a tufted carpet comprising the steps of applying a hot melt adhesive composition to the bottom surface of a tufted structure by contacting the bottom surface of the tufted structure with a hot melt applicator roll and, thereafter, placing in contact with the adhesively coated bottom surface of the tufted structure a secondary scrim, the improvements comprising:

(a) applying a specified pressure on said tufted structure while it is in contact with said applicator roll, said pressure being applied by means of at least one hold-down roll positioned above the applicator roll and in contact with the top surface of the tufted structure, the clearance between said hold-down roll and said applicator roll being represented by the formula $$\Delta R_c = \frac{\beta ST}{12} \pm 0.060$$

wherein $\Delta R_c$ = the clearance in inches
$S$ = the stitches per inch of the tufted scrim structure
$T$ = the pile height in inches, and
$\beta$ = a constant which is dependent on the particular fiber employed, (b) placing the secondary scrim in contact with the adhesively coated bottom side of the tufted structure substantially immediately after the structure leaves the applicator roll, and (c) supporting the tufted structure containing the secondary scrim until the adhesive composition has cooled below its hot tack temperature.

DESCRIPTION OF THE DRAWING

FIG. 1 schematically depicts an arrangement of apparatus which can be used in accomplishing the present process.

DESCRIPTION OF PREFERRED EMBODIMENTS

The attached drawing generally shows the process steps involved in preparing tufted carpet according to the present invention. The bottom surface of a tufted structure 10 is initially contacted with an applicator roll 12 bearing a hot melt adhesive composition supplied from the reservoir 14. A pair of hold-down rolls 16 and 18 are positioned above the applicator roll 12 and are in contact with the top surface of the tufted structure 10. These rolls are separated from the applicator roll 12 by a given distance and serve to maintain a specified pressure on the tufted structure 10 while it is in contact with the applicator roll. The amount of hot melt adhesive deposited on the bottom side of the tufted structure can be controlled by the doctor blade 20. Subsequent to the application of the hot melt adhesive composition, a secondary scrim 22 is placed in contact with the adhesively coated bottom surface of the tufted scrim structure. Such contact is achieved as soon as possible after the tufted structure leaves the applicator roll, and is conveniently accomplished by means of a pair of pressure nip rolls 24 and 26 which assure intimate contact between the secondary scrim 22 and the bottom side of the tufted structure 10. After passing between the pressure nip rolls 24 and 26, the carpet structure is passed over and in contact with the support 28 until the adhesive composition has cooled below its hot tack temperature. Thereafter, the structure is passed through a second set of pressure nip rolls 30 and 32 and then to a conventional tenter frame and cooler.

The manner in which the tufted structure 10 of the present invention is prepared is not particularly limited. The art of preparing such tufted structures is well known and, by such methods, tufted structures are usually prepared with a range of tuft densities (stitches per inch) and pile heights. Ordinarily, tuft densities range from about 6 to 9 stitches per inch as measured on the backside of the tufted scrim structure with pile heights of about ¼–¾ inch. For a detailed description of methods and materials useful in making tufted carpets, reference is made to copending U.S. patent application Ser. No. 549,461, filed on May 12, 1966 in the name of Seymour Sands, now U.S. Pat. 3,390,035.

A variety of hot melt adhesive compositions are useful in practicing the process of the present invention. While such adhesive compositions can consist solely of a polymeric binder resin, such as an ethylene/vinyl acetate copolymer, for economic reasons they generally include substantial quantities of other ingredients. Thus, in addition to a polymeric binder resin, useful adhesive compositions generally contain at least one of the following ingredients: waxes, fillers, and resin extenders. Also, in addition to ethylene/vinyl acetate resins other types of resins such as polyethylenes and ethylene/acrylate or methacrylate copolymers can be used. Reference is made to the above-mentioned Sands application as well as U.S. Ser. No. 656,683, filed on July 28, 1967 in the name of Roland E. Stahl for a description of many useful adhesive compositions. Particularly preferred compositions are described in the Stahl application which comprise, based on the weight of (a), (b) and (c), about (a) 10–35 weight percent of an ethylene/vinyl acetate copolymer containing about 15–40 weight percent vinyl acetate, (b) about 10–25 weight percent petroleum wax, (c) about 50–70 weight percent of a thermoplastic resin blend. Further, these compositions usually contain up to about 45 weight percent filler, based on the total composition.

An essential feature of the present process is the maintenance of a specifically determined pressure on the tufted structure while it is in contact with the applicator roll. It has been discovered that if the appropriate pressure is not maintained on the tufted structure the resulting carpet will be deficient in either scrim bond strength or in fuzz resistance. The first of these deficiencies will generally be experienced when too great a pressure is placed upon the tufted structure while the latter deficiency will be evident with too little pressure. Consequently, in order to obtain the combination of high scrim bond and high fuzz resistance, it is necessary to maintain a particular pressure on the structure while it is in contact with the applicator roll. As illustrated in the attached drawing, a convenient way of maintaining the appropriate pressure is through the use of hold-down rolls. While two rolls are illustrated, it should be understood that only one or more than two rolls can also be employed. By setting the hold-down roll(s) a specified distance from the applicator roll, a given amount of pressure can be applied to the tufted structure as it passes over the applicator roll. Quite obviously, the smaller the clearance between the hold-down roll(s) and the applicator roll, the greater will be the pressure on the tufted structure.

Many factors influence the proper determination of the amount of clearance to be maintained between the hold-down roll(s) and the applicator roll. These factors include the carpets tuft density, pile height, type of fiber employed, amount of adhesive applied, and the application viscosity of the adhesive composition. Since, for most commercial carpet applications, it is desirable to apply about 16–24 ounces of adhesive per square yard of carpet and accomplish the adhesive application at a viscosity of about 8000–15,000 centipoises (determined according to any standard viscosity measuring equipment), the following description of the manner in which the appropriate roll clearance is determined is presented with these two variables being considered as fixed within the above limits. However, as will be apparent, if appreciably higher or lower application viscosities or adhesive amounts are used, the appropriate roll clearance can be determined by simple experimentation.

According to the present invention, the clearance between the hold-down roll(s) and the applicator roll, for a particular carpet, is calculated from the following formula:

$$\Delta R_c = \frac{\beta ST}{12} \pm 0.060$$

wherein $\Delta R_c$ = the clearance in inches between the surface of the hold-down roll(s) and the surface of the applicator roll measured at their closest point,
S = the carpet density in stitches per inch,
T = the height of the carpet pile in inches, and
$\beta$ = a constant which is dependent on the particular fiber employed.

The value of $\beta$ is determined experimentally for a particular fiber by conducting several runs on a particular tufted structure at various hold-down roll clearances and, thereafter, determining the exact clearance at which the best combination of scrim bond and fuzz resistance are obtained. During these runs the amount of adhesive application and its viscosity are held constant as are the other variables. After the proper hold-down clearance is determined, the factor $\beta$ can be back calculated using the above formula. Thereafter, the appropriate hold-down clearance can be determined by using the formula for carpets of similar fibers but varying in stitch density and pile height. Representative values of $\beta$ are about 0.75 for nylon fibers, about 1.0 for polypropylene fibers, about 1.5 for acrylic fibers, about 1.0 for polyester fibers, and about 1.5 for wool.

In practice, it may frequently be necessary to slightly adjust the calculated hold-down roll clearance in order to obtain the most optimum carpet. However, such adjustment, in either direction, will rarely exceed 0.060″ and, ordinarily, will not exceed 0.050″. Where appreciably different viscosities or adhesive amounts than those previously specified are employed, the appropriate clearance can be established by dividing the quantity ($\beta ST$) by a number other than 12 or by a suitable adjustment in the value of $\beta$.

A further essential feature of the present process involves the lamination of the secondary scrim to the adhesively coated backside of the carpet structure substantially immediately after the structure leaves the applicator roll. Such immediate lamination ensures a high scrim bond in the resulting carpet. For highest scrim bonds, the secondary scrim is laminated to the carpet structure at about as geometrically close to the point at which the structure leaves the applicator or hold-down roll as possible, i.e., usually not more than 2–3 inches.

After scrim lamination, it is necessary to support the carpet structure until the adhesive composition has cooled below its hot tack temperature. This step is necessary in order to ensure that the adhesive adequately wets the secondary scrim while being supported. Failure to do this results in carpets with inferior secondary scrim bonds.

While, in most instances, sufficient wetting is achieved by the time the adhesive has cooled to its hot tack temperature, if it is found that such has not occurred, the structure can be heated by independent means before or while in contact with the support. Similarly, cooling means can also be employed if adequate wetting is rapidly achieved after lamination. A convenient support is a table upon which the carpet can be passed over. Hot tack temperatures for most adhesives useful in the present invention are about 160–210° F. and are indicated by the softening points of the adhesive determined by customary techniques.

The following examples illustrate the present invention. All parts and percentages are by weight unless otherwise specified. In the examples, the carpet designated in Table I was finished using apparatus similar to that shown in FIG. 1 with the following specifications:

Applicator roll 12—12″ diameter–17′ long, steam heated, driven at 15 f.p.m.
Hold-down rolls 16 and 18—8″ diameter–17′ long, water cooled idler-positioned 49° and 32° respectively from the center line of the applicator roll
Pressure roll 26—6″ diameter–17′ long, water cooled idler
Pressure roll 24—10″ diameter–17′ long, steam heated idler
Support 28—7′ long–17′ wide table
Pressure rolls 30 and 32—6″–17′ long idler rolls
At closest point, surface separation between rolls 18 and 24—1.5 inches.

The following adhesive composition was used:

| | Parts |
|---|---|
| Ethylene/vinyl acetate copolymer (25 wt. percent Vac-2 Melt Index) | 15 |
| Microcrystalline wax (M.P.=180° F.) | 10.2 |
| Polyethylene wax (M.W.=3500, M.P.=240° F.) | 1.8 |
| "Piccovar" AP-25 (Pennsylvania Industrial Chemical Corp.'s dicyclopentadiene alkylation polymer, softening point 71° F.–83° F., specific gravity 0.97) | 17.2 |
| "Piccopale" 110SF (Pennsylvania Industrial Chemical Corp., softening point 225° F.–235° F., specific gravity 0.97, thermoplastic resin) | 25.6 |
| Antioxidant | 0.2 |
| Calcium carbonate filler | 30 |

Table I illustrates useful process conditions for preparing several finished carpets while Table II sets forth the properties of the finished carpets.

I claim:
1. In the process of preparing a tufted carpet comprising the steps of applying a hot melt adhesive composition to the bottom surface of a tufted structure by contacting the bottom surface of the tufted structure with a hot melt applicator roll and, thereafter, placing in contact with the adhesively coated bottom surface of the tufted structure a secondary scrim, the improvements comprising:
  (a) applying a specified pressure on said tufted structure while it is in contact with said applicator roll, said pressure being applied by means of at least one hold-down roll positioned above the applicator roll and in contact with the top surface of the tufted structure, the clearance between said hold-down roll and said applicator roll being represented by the formula

$$\Delta R_c = \frac{\beta ST}{12} \pm 0.060$$

wherein
  $\Delta R_c$ = the clearance in inches
  $S$ = the stitches per inch of the tufted scrim structure
  $T$ = the pile height in inches, and
  $\beta$ = a constant varying from about 0.75 to about 1.5 which is dependent on the particular fiber employed,
  (b) placing the secondary scrim in contact with the adhesively coated bottom side of the tufted structure substantially immediately after the structure leaves the applicator roll, and
  (c) supporting the tufted structure containing the secondary scrim until the adhesive composition has cooled below its hot tack temperature.

2. The process of claim 1 wherein the carpet is prepared from nylon, polypropylene, polyester, wool, or acrylic fibers with $\beta$ having a value of 0.75, 1.0, 1.0, 1.5, or 1.5, respectively.

3. The process of claim 2 wherein at least two hold-down rolls are used.

4. The process of claim 3 wherein the hot melt adhesive composition is applied at a viscosity of about 8000–15,000 centipoises and in an amount of about 16–24 oz. per sq. yd. of carpet.

TABLE I

| Carpet * | | | Process Conditions | | | | | |
|---|---|---|---|---|---|---|---|---|
| Fiber type | Density (st./in.) | Pile height (in.) | ΔR_c (calc'd) (in.) | ΔR_c (actual) (in.) | Carpet speed (f.p.m.) | Adhesive temp. (° F.) | Adhesive visc. (cp.) | Amount adhesive applied (oz./yd.²) |
| Example: | | | | | | | | |
| A ... Nylon | 6–7 | ½ | 0.20 | 0.22 | 30 | 320 | 10,000 | 19 |
| B ... Polypropylene | 7–8 | 9/16 | 0.35 | 0.30 | 30 | 320 | 10,000 | 22 |
| C ... Acrylic | 6–7 | ⅜ | 0.34 | 0.30 | 30 | 320 | 10,000 | 20 |

* 8 oz. jute for all secondary backings, 10 oz. jute primary backing for polypropylene and acrylic carpets and 4 oz. polypropylene woven backing for nylon carpet.

TABLE II

| | Finished carpet properties | | |
|---|---|---|---|
| | Tuft pull [1] (lbs.) | Scrim bond [2] (lbs./3″) | Pill resistance [3] |
| Example: | | | |
| A | >10 | 14.6 | 4.5 |
| B | >10 | 19.2 | 4.5 |
| C | >10 | 27.7 | |

[1] Measured by ASTM D-1335-67.
[2] Measured by basic peel test techniques on 3″ wide strips.
[3] Measured by tumbling carpet samples in the presence of an abrading material for ten hours and subsequently visually rating the development of pilling using a rating scale of 1 to 5.

5. The process of claim 4 wherein the adhesive composition comprises (a) 10–35 weight percent of an ethylene/vinyl acetate copolymer containing about 15–40 weight percent vinyl acetate, (b) 10–25 weight percent petroleum wax, and (c) about 50–70 weight percent of a thermoplastic resin blend, the weight percent being based on the combined weight of (a), (b), and (c).

6. The process of claim 5 wherein the adhesive composition contains up to about 45 weight percent filler based on the weight of the total compositions.

7. The process of claim 6 wherein two hold-down rolls are used.

8. The process of claim 7 wherein the carpet is prepared from nylon, polypropylene, or acrylic fibers with $\beta$ having a value of 0.75, 1.0, or 1.5, respectively.

References Cited

UNITED STATES PATENTS

| | | | |
|---|---|---|---|
| 3,007,836 | 11/1961 | McNamara et al. | 156—72X |
| 3,166,465 | 1/1965 | Rahmes | 156—72X |
| 3,348,992 | 10/1967 | Cochran II | 156—72X |
| 3,390,035 | 6/1968 | Sands | 156—72 |

CARL D. QUARFORTH, Primary Examiner

S. HELLMAN, Assistant Examiner

U.S. Cl. X.R.

156—435